(12) United States Patent
Hirooka et al.

(10) Patent No.: US 10,919,480 B2
(45) Date of Patent: Feb. 16, 2021

(54) RETAINER AND GAS GENERATOR

(71) Applicant: Daicel Corporation, Osaka (JP)

(72) Inventors: Masato Hirooka, Tatsuno (JP); Koji Yamamoto, Tatsuno (JP); Masayuki Yamazaki, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 43 days.

(21) Appl. No.: 16/348,036

(22) PCT Filed: Dec. 4, 2017

(86) PCT No.: PCT/JP2017/043501
§ 371 (c)(1),
(2) Date: May 7, 2019

(87) PCT Pub. No.: WO2018/110350
PCT Pub. Date: Jun. 21, 2018

(65) Prior Publication Data
US 2019/0308581 A1    Oct. 10, 2019

(30) Foreign Application Priority Data

Dec. 16, 2016 (JP) .................................. 2016-243881
Oct. 5, 2017 (JP) .................................. 2017-194769

(51) Int. Cl.
*B60R 21/217* (2011.01)
*B60R 21/264* (2006.01)

(52) U.S. Cl.
CPC .......... *B60R 21/217* (2013.01); *B60R 21/264* (2013.01)

(58) Field of Classification Search
CPC .............................. B60R 21/264; B60R 21/217
(Continued)

(56) References Cited

U.S. PATENT DOCUMENTS 9,539,977 B2 * 1/2017 Fudamoto ............. B60R 21/264
9,969,347 B2 * 5/2018 Sekino .................. B60R 21/217
(Continued)

FOREIGN PATENT DOCUMENTS

JP    2007-62461 A    3/2007
JP    2010-163044 A   7/2010
JP    2015-30328 A    2/2015

*Primary Examiner* — Toan C To
(74) *Attorney, Agent, or Firm* — Birch, Stewart, Kolasch & Birch, LLP

(57) ABSTRACT

The present invention provides a retainer for retaining, from outside, a housing of a gas generator including a circumferential wall provided with no flange, the retainer including a combination of a first retainer and a second retainer,
the first retainer having a first annular circumferential wall, a first flange, a first inward protruding portion and a first folded portion,
the second retainer having a second annular circumferential wall and a second flange, and
the first retainer being fitted from the side of the top plate or the side of the bottom plate of the housing of the gas generator such that the first annular circumferential wall abuts against a part of the circumferential wall of the housing of the gas generator, the second retainer being fitted from the side of the bottom plate or the side of the top plate of the housing of the gas generator such that the second annular circumferential wall abuts against a remaining part of the circumferential wall of the housing of the gas generator, and
the first flange and the second flange being abutted against each other, so as to retain the housing of the gas generator.

12 Claims, 4 Drawing Sheets

(58) Field of Classification Search
USPC .......................................................... 280/741
See application file for complete search history.

(56) References Cited

U.S. PATENT DOCUMENTS

| | | |
|---|---|---|
| 2001/0035632 A1* | 11/2001 | Amamori .............. B60R 21/233 |
| | | 280/728.2 |
| 2007/0046005 A1 | 3/2007 | Hanano et al. |
| 2011/0259234 A1 | 10/2011 | Kobayashi et al. |
| 2016/0152204 A1 | 6/2016 | Abe et al. |

* cited by examiner

[Fig. 1]
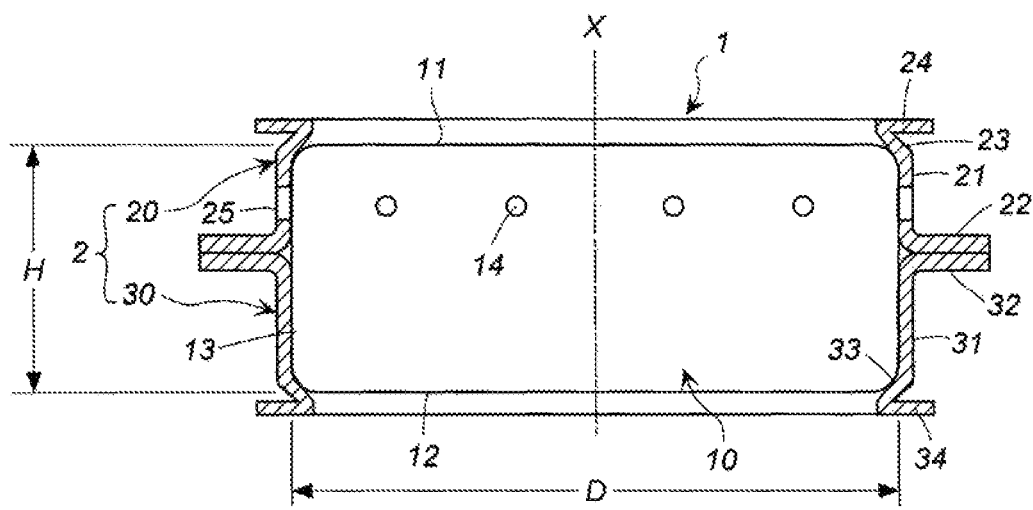
[Fig. 2]
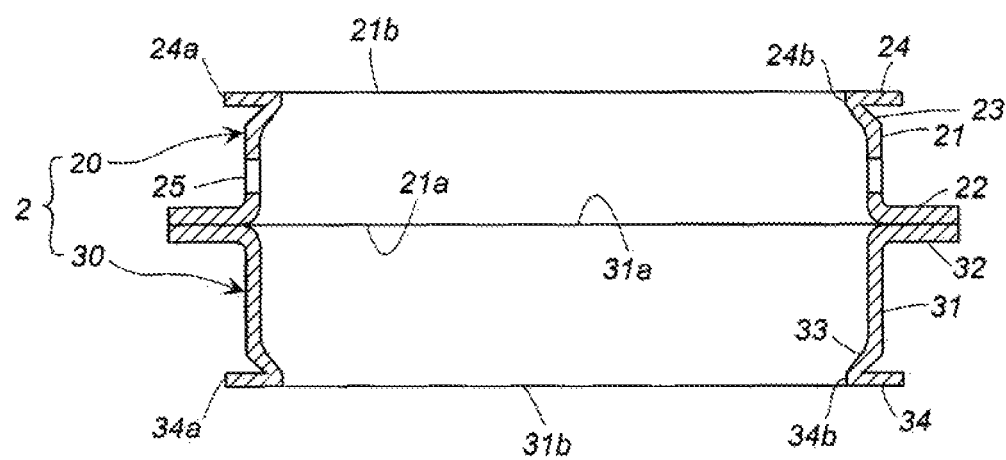

[Fig. 3]
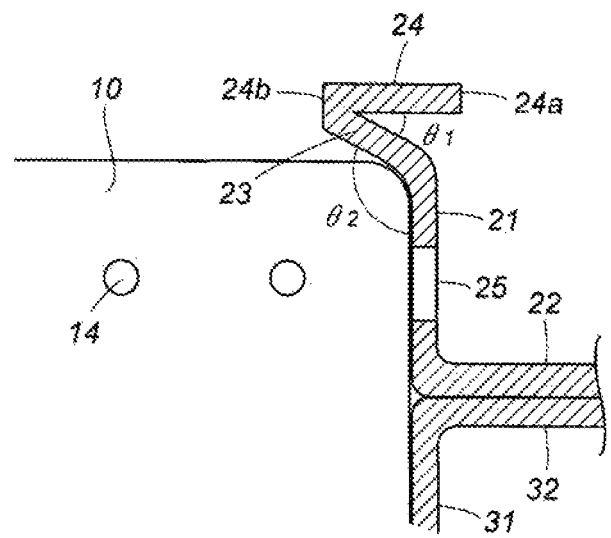
[Fig. 4]
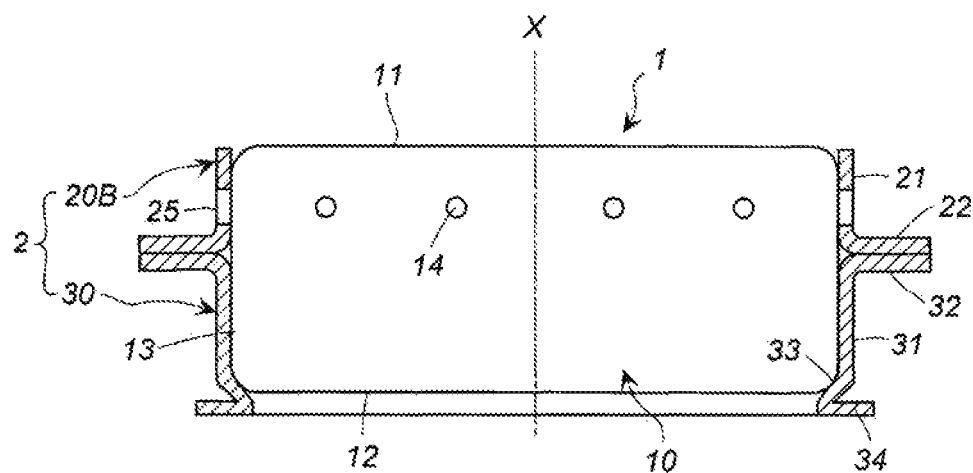

[Fig. 5]
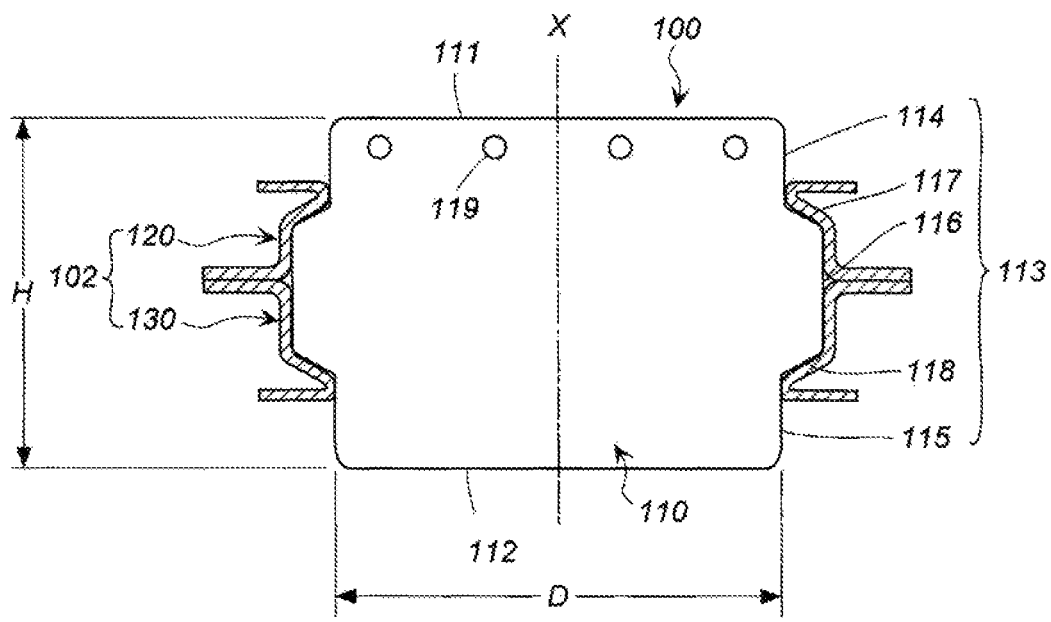
[Fig. 6]
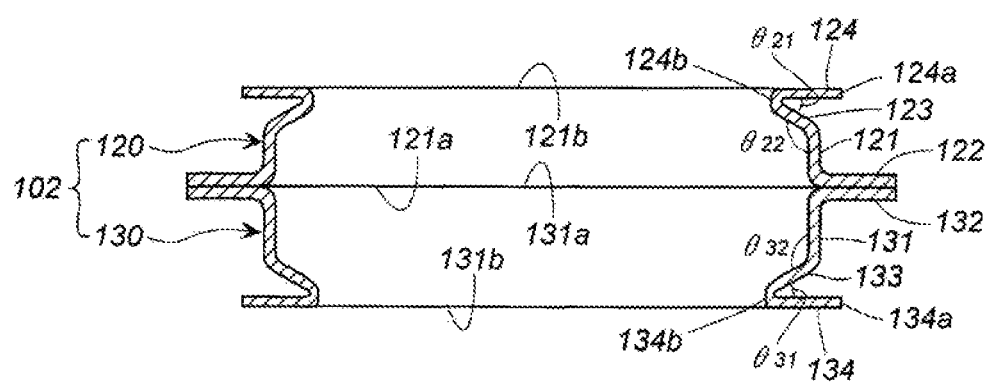

[Fig. 7]
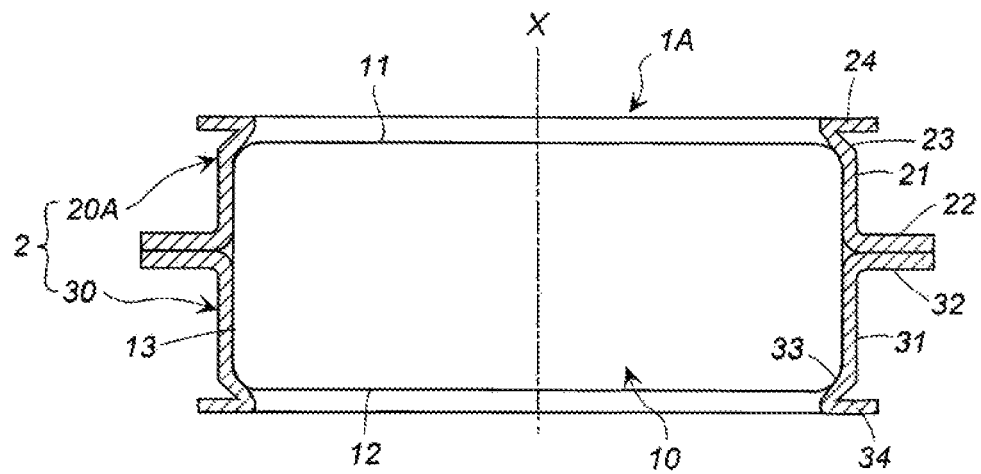
[Fig. 8]
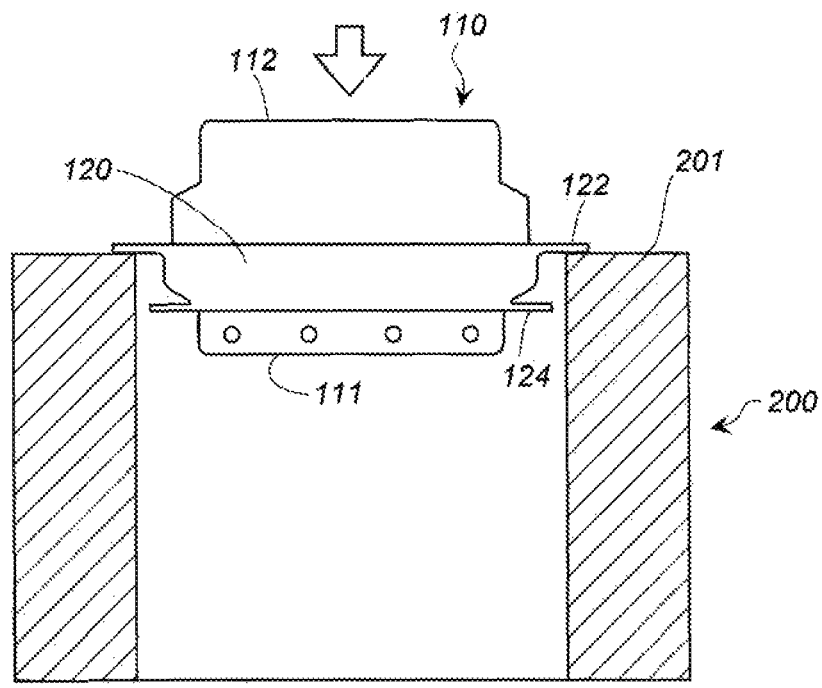

US 10,919,480 B2

RETAINER AND GAS GENERATOR

TECHNICAL FIELD

The present invention relates to a retainer for retaining a gas generator which can be used in an airbag apparatus mounted on an automobile or the like, and a gas generator including the retainer.

BACKGROUND OF THE INVENTION

As a known form of a gas generator, the gas generator is mounted to a module case with the use of a flange formed with a gas generator housing (FIG. 1 in JP 2007-62461 A, FIG. 1 in JP 2010-163044 A).

A gas generator using a housing with no flange is also known (JP 2015-30328 A). The use of the gas generator including the housing with no flange and a retainer for the housing is advantageous in that adjustment of a threaded hole structure (a pitch of the threaded hole and a size of the threaded hole) of the retainer corresponding to a threaded hole structure of the module case is made easier.

JP 2015-30328 A discloses an invention of a mounting structure of an inflator including a housing with no flange. A projecting part (a swelled part in a middle portion in a height direction) 20 formed in an inflator 12 is fixed by an upper flange member 32 and a lower flange member 34. The upper flange member 32 is folded inward at a step 50 and abuts against a step 48 of the projecting part 20. Similarly, in the lower flange member 34, a step 54 formed by a small diameter part 44b and a large diameter part 44a is matched to the projecting part 20 to fix it.

SUMMARY OF INVENTION

The present invention provides a retainer (a retainer of a first aspect) for retaining, from outside, a housing of a gas generator including a top plate, a bottom plate axially opposing the top plate, and a circumferential wall provided with no flange and formed between the top plate and the bottom plate, the retainer including a combination of a first retainer and a second retainer;

the first retainer having, a first annular circumferential wall, a first flange which protrudes radially outward from a first end opening of the first annular circumferential wall, a first inward protruding portion which protrudes radially inward at the side of a second end opening of the first annular circumferential wall, and a first folded portion which is folded radially outward from the first inward protruding portion;

the second retainer having, a second annular circumferential wall, and a second flange which protrudes radially outward from a first end opening of the second annular circumferential wall, the first retainer being fitted from the side of the top plate or the side of the bottom plate of the housing of the gas generator such that the first annular circumferential wall abuts against a part of the circumferential wall of the housing of the gas generator, the second retainer being fitted from the side of the bottom plate or the side of the top plate of the housing of the gas generator such that the second annular circumferential wall abuts against a remaining part of the circumferential wall of the housing of the gas generator, and the first flange and the second flange being abutted against each other, so as to retain the housing of the gas generator.

Further, the present invention provides gas generators in which respective housings indifferent shapes are retained by the retainer of the present invention.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows a view showing a gas generator to which a retainer of the present invention is mounted from outside, only the retainer being shown as a cross-sectional view in a direction of an axis X, and the gas generator being shown as a front view;

FIG. 2 shows a cross-sectional view in the direction of the axis X of the retainer in FIG. 1;

FIG. 3 shows a partially enlarged cross-sectional view of FIG. 1;

FIG. 4 shows a view showing another embodiment of the gas generator to which the retainer of the present invention is mounted from outside, only the retainer being shown as a cross-sectional view in the direction of the axis X, and the gas generator being shown as a front view;

FIG. 5 shows a view showing yet another embodiment of the gas generator to which the retainer of the present invention is mounted from outside, only the retainer being shown in a cross-sectional view in the direction of the axis X, and the gas generator being shown in a front view;

FIG. 6 shows a cross-sectional view in the direction of the axis X of the retainer in FIG. 5;

FIG. 7 shows a view showing yet another embodiment of the gas generator to which the retainer of the present invention is mounted from outside, only the retainer being shown as a cross-sectional view in the direction of the X axis, and the gas generator being shown as a front view; and FIG. 8 shows an explanatory view of a test method of examples.

DETAILED DESCRIPTION OF INVENTION

In JP 2015-30328 A, thicknesses of the upper flange member and the lower flange member are substantially equal to each other at any portion and, from the viewpoint of preventing movement of the housing of the inflator in an axial direction (a vertical direction in the drawing), there is room for improvement in the movement prevention by the step 50 and the small diameter part 44b (i.e., preventing the step 50 and the small diameter part 44b from being pushed outward by expansion of the housing and disconnected from the housing).

The present invention provides a retainer in which a retaining force when retaining a housing of a gas generator from outside is increased, and a gas generator including the retainer.

The retainer of a first aspect is an invention of the retainer retaining the housing of the gas generator from outside.

The housing does not include a housing 13 shown in FIG. 1 of JP 2007-62461 A in which circumferential walls of a closure shell 11 and a diffuser shell 12 forming the housing 13 have a flange on the side of an opening respectively (note that any of the flanges is used for fixing a gas generator to a module or the like), and a housing 11 shown in FIG. 1 of JP 2010-163044 A which has a flange 12b and a stepped portion obtained from a state of connection between two members (a diffuser shell 12 and a closure shell 13) forming the housing 11.

As such a housing with no flange, for example, the housing in the form shown in FIG. 2 of JP 2015-30328 A, a housing 11 shown in FIG. 1 of JP 2013-224088 A, a housing 111 shown in FIG. 2 thereof, a housing 211 shown in FIG. 3 thereof, or a housing 311 shown in FIG. 4 thereof may be used. Note that slightly protruding flanges indicated by reference numerals 19 and 20 respectively in FIG. 1 of JP 2006-160199 A, for fixing a diffuser shell and a closure shell forming a housing, are different from the flange of the retainer of the present invention.

An external shape of the housing is a cylindrical shape, and the housing has a ratio (H/D) of a diameter (D) of a bottom plate and a height (H) from an outer surface of the bottom plate to an outer surface of a top plate of preferably 0.3 to 1.5, more preferably 0.3 to 1.2. The outer diameter of the housing may be constant, and the housing may include a portion having a larger outer diameter and a portion having a smaller outer diameter.

A gas discharge port formed in the housing can be formed in one or both of a circumferential wall and the top plate of the housing.

In the retainer of the first aspect, a first retainer is different in shape from a second retainer.

In addition to a first annular circumferential wall and a first flange, the first retainer has a first inward protruding portion and a first folded portion.

The first annular circumferential wall is a portion which abuts against and retains the circumferential wall of the housing.

The first flange is used together with a second flange of the second retainer for connecting the gas generator to an airbag or fixing the gas generator to a module case when the gas generator is accommodated in the module case. The first flange may have a through hole in a thickness direction, through which a bolt or the like passes, if necessary.

The first folded portion has a function (reinforcement function) of preventing a decline of the retaining force of the first retainer applied to the housing during the use of the first retainer.

The first folded portion is folded outward at a distal end of the first inward protruding portion, and is formed annularly.

In the first retainer, the retaining force to the housing is increased particularly by a combination of the first inward protruding portion and the first folded portion, and hence the retaining force of the first retainer is larger than that of the second retainer.

The second retainer has a second annular circumferential wall and the second flange.

The second annular circumferential wall is a portion which abuts against and retains the circumferential wall of the housing together with the first annular circumferential wall.

The second flange is used together with the first flange of the first retainer for connecting the gas generator to the airbag or fixing the gas generator to the module case when the gas generator is accommodated in the module case. The second flange may have a through hole in a thickness direction through which a bolt or the like passes, if necessary.

The retainer of the first aspect retains the housing of the gas generator by fitting the second retainer from the side of the bottom plate when the first retainer is fitted from the side of the top plate, fitting the second retainer from the side of the top plate when the first retainer is fitted from the side of the bottom plate, and causing the first flange of the first retainer and the second flange of the second retainer to abut against each other.

In the first aspect, it is preferable that the first retainer is fitted on the side of the bottom plate which has a larger degree of deformation during actuation, and the second retainer is fitted on the side of the top plate.

The gas generator retained by the retainer of the first aspect from outside is accommodated in the module case together with the airbag with the use of the first flange and the second flange, and is used. When the housing of the gas generator deforms during actuation, the first retainer and the second retainer function to suppress the deformation.

In a retainer (a retainer of a second aspect) which is a preferable aspect of the retainer of the present invention (the first aspect), the second retainer has the second annular circumferential wall, and the second flange protruding radially outward from the first end opening of the second annular circumferential wall, and further has, a second inward protruding portion protruding radially inward at the side of a second end opening of the second annular circumferential wall, and a second folded portion folded radially outward from the second inward protruding portion.

In the retainer of the second aspect, a shape of the first retainer is identical to a shape of the second retainer. Consequently, the first retainer and the second retainer can be fitted from both of the side of the top plate and the side of the bottom plate.

The second annular circumferential wall and the second inward protruding portion of the second retainer abuts against and retains the housing.

Similarly to the first folded portion of the first retainer, the second folded portion functions to prevent a decline of the retaining force of the second retainer applied to the housing during the use of the second retainer. The second folded portion is preferably annular.

The second flange is used together with a first flange of the first retainer for connecting the gas generator to an airbag or fixing the gas generator to a module case when the gas generator and the air bag are accommodated in the module case. The second flange may have a through hole in a thickness direction, for using a bolt, if necessary.

When the housing of the gas generator deforms during actuation, the first retainer and the second retainer function to suppress the deformation.

In the retainer of the second aspect, the shape of the second retainer is identical to the shape of the first retainer, and the retaining force applied to the housing is further increased.

In a retainer (a retainer of a third aspect) which is another preferable aspect of the retainer of the first aspect, the first annular circumferential wall of the first retainer or the second annular circumferential wall of the second retainer has a plurality of through holes corresponding to a plurality of gas discharge ports provided in the circumferential wall of the housing of the gas generator when the housing of the gas generator is retained from outside.

In the housing of the gas generator, when an ignition device including an igniter is mounted to the side of the bottom plate and the gas discharge ports are formed in the circumferential wall on the side of the top plate, in the case where the first retainer with no through hole or the second retainer with no through hole is fitted from the side of the top plate, the gas discharge ports are closed by the first retainer or the second retainer. A state in which the gas discharge ports are open is maintained with the use of the first or second retainer having the plurality of the through holes, the first or second retainer being fitted such that the plurality of the through holes overlap the plurality of the gas discharge ports of the housing of the gas generator respectively.

The number of the through holes may be equal to the number of the gas discharge ports, and all of the gas discharge ports may be open with the through holes smaller in number than the gas discharge ports.

A size of the through hole is equal to or larger than a size of the gas discharge port of the housing. A shape of the through hole may be identical to or different from a shape of the gas discharge port of the housing. When the shape of the through hole is identical to the shape of the gas discharge port, the through hole and the gas discharge port are preferably circular and, when the shape of the through hole is different from the shape of the gas discharge port, the gas discharge port can be circular, and the through hole can be oblong, rectangular, or square.

In a retainer (a retainer of a fourth aspect) which is another preferable aspect of the retainer of the second aspect, the first annular circumferential wall of the first retainer has a plurality of through holes corresponding to a plurality of gas discharge ports of the circumferential wall of the housing of the gas generator when the housing of the gas generator is retained from outside.

In the housing of the gas generator, when the ignition device including the igniter is mounted to the side of the bottom plate and the gas discharge ports are formed in the circumferential wall on the side of the top plate, in the case where the first retainer with no through hole is fitted from the side of the top plate, the gas discharge ports are closed by the first retainer. A state in which the gas discharge ports are open is maintained with the use of the first retainer having the plurality of the through holes, the first retainer being fitted such that the plurality of the through holes overlap the plurality of the gas discharge ports of the housing of the gas generator respectively.

The number of the through holes may be equal to the number of the gas discharge ports, and all of the gas discharge ports may be open with the through holes smaller in number than the gas discharge ports.

A size of the through hole is equal to or larger than a size of the gas discharge port of the housing. A shape of the through hole may be identical to or different from a shape of the gas discharge port of the housing. When the shape of the through hole is identical to the shape of the gas discharge port, the through hole and the gas discharge port are preferably circular and, when the shape of the through hole is different from the shape of the gas discharge port, the gas discharge port can be circular, and the through hole can be oblong, rectangular, or square.

The present invention provides a gas generator (a gas generator of the first aspect), including:

the housing retained by the retainer of the third aspect from outside, the housing having the top plate, the bottom plate axially opposing the top plate, the circumferential wall provided with no flange and formed between the top plate and the bottom plate, and the plurality of the gas discharge ports formed in the circumferential wall on the side of the top plate, when the second retainer has the through holes, the second annular circumferential wall of the second retainer abutting against a part of the circumferential wall of the housing such that the plurality of the through holes overlap the gas discharge ports respectively in a thickness direction, the first annular circumferential wall of the first retainer abutting against a remaining part of the circumferential wall of the housing, and a boundary portion between the first annular circumferential wall and the first inward protruding portion abutting against a boundary portion between the bottom plate and the circumferential wall, when the first retainer has the through holes, the first annular circumferential wall of the first retainer abutting against the part of the circumferential wall of the housing such that the plurality of through holes overlap the gas discharge ports in the thickness direction respectively, and the boundary portion between the first annular circumferential wall and the first inward protruding portion abutting against a boundary portion between the top plate and the circumferential wall;

the second annular circumferential wall of the second retainer abutting against a remaining part of the circumferential wall of the housing; and the first flange and the second flange abutting against each other.

With regard to the first retainer and the second retainer of the third aspect, the first annular circumferential wall of the first retainer or the second annular circumferential wall of the second retainer has the through holes.

When the first retainer and the second retainer of the third aspect are mounted to the housing, the retainer having the plurality of the through holes is fitted from the side of the top plate, and the retainer with no through holes is fitted from the side of the bottom plate. At this point, the retainers are fitted such that the plurality of the through holes overlap the plurality of the gas discharge ports of the housing respectively in the thickness direction, that is, all of the gas discharge ports of the housing are open.

As the gas generator of the first aspect, preferable is an aspect in which the second retainer having the through holes is used, the second retainer is fitted onto the housing from the side of the top plate, and the first retainer is fitted onto the housing from the side of the bottom plate.

During the actuation of the gas generator, when the housing deforms due to a combustion gas generated by combustion of a gas generating agent therein, an outward force directly acts on each of the first retainer and the second retainer, and the first annular circumferential wall is about deform in an outward direction (a direction of a central axis of the housing, a direction orthogonal to the central axis, and a direction oblique to the central axis).

At this point, the first retainer and the second retainer have a function of supporting the housing. Particularly, the first folded portion (or the first folded portion and the second folded portion) has a function of supporting the housing in the axial direction. Accordingly, when the outward force is applied to the housing, the first folded portion (or the first folded portion and the second folded portion) functions to block the force, and hence the retaining force of the retainer to the housing is maintained.

The present invention provides a gas generator (a gas generator of a second aspect), including:

the housing retained by the retainer of the fourth aspect from outside, the housing having the top plate, the bottom plate axially opposing the top plate, the circumferential wall provided with no flange and formed between the top plate and the bottom plate, and the plurality of the gas discharge ports formed in the circumferential wall on the side of the top plate, the first annular circumferential wall of the first retainer abutting against a part of the circumferential wall of the housing such that the plurality of the through holes overlap the gas discharge ports in a thickness direction, and a boundary portion between the first annular circumferential wall and the first inward protruding portion abutting against a boundary portion between the top plate and the circumferential wall, the second annular circumferential wall of the second retainer abutting against a remaining part of the circumferential wall of the housing, and a boundary portion between the second annular circumferential wall and the second inward protruding portion abutting against a boundary portion between the bottom plate and the circumferential wall, and the first flange and the second flange abutting against each other.

In the retainer of the fourth aspect, the first retainer has the plurality of the through holes.

When the first retainer and the second retainer of the fourth aspect are mounted to the housing, the first retainer having the through holes is fitted from the side of the top plate, and the second retainer with no through holes is fitted from the side of the bottom plate. At this point, the retainers are fitted such that the plurality of the through holes of the first annular circumferential wall of the first retainer overlap the gas discharge ports of the housing respectively in the thickness direction, that is, all of the gas discharge ports of the housing are open.

During the actuation of the gas generator, when the housing deforms due to a combustion gas generated by combustion of a gas generating agent therein, an outward force directly acts on each of the first retainer and the second retainer, and the first annular circumferential wall and the second annular circumferential wall are about to deform in an outward direction (a direction of a central axis of the housing, a direction orthogonal to the central axis, and a direction oblique to the central axis).

At this point, the first retainer and the second retainer have a function of supporting the housing. Particularly, the first folded portion and the second folded portion have a function of supporting the housing in the axial direction. Accordingly, when the outward force is applied to the housing, the first folded portion and the second folded portion function to block the force, and hence the retaining force of the retainer to the housing is maintained.

The present invention provides a gas generator (a gas generator of a third aspect), including:

the housing retained by the retainer of the first aspect from outside, the housing having the top plate, the bottom plate axially opposing the top plate, the circumferential wall provided with no flange and formed between the top plate and the bottom plate, and a plurality of gas discharge ports formed in the top plate, the first annular circumferential wall of the first retainer abutting against a part of the circumferential wall of the housing, and a boundary portion between the first annular circumferential wall and the first inward protruding portion abutting against a boundary portion between the top plate or the bottom plate and the circumferential wall, the second annular circumferential wall of the second retainer abutting against a remaining part of the circumferential wall of the housing; and the first flange and the second flange abutting against each other.

The gas generator of the third aspect has the plurality of the gas discharge ports in the top plate of the housing.

With regard to the retainer of the first aspect used in the gas generator of the third aspect, it is preferable to use the first retainer and the second retainer which have no through hole. However, in order to reduce weights of the first retainer and the second retainer, one or both of the first retainer and the second retainer may have the through holes within such a range that the function of retaining the housing is maintained. In that case, the number of the through holes and a formation position of the through hole are not particularly limited.

The present invention provides a gas generator (a gas generator of a fourth aspect), including:

the housing retained by the retainer of the second aspect from outside;

the housing having the top plate, the bottom plate axially opposing the top plate, the circumferential wall provided with no flange and formed between the top plate and the bottom plate, and a plurality of gas discharge ports formed in the top plate, the first annular circumferential wall of the first retainer abutting against a part of the circumferential wall of the housing, and a boundary portion between the first annular circumferential wall and the first inward protruding portion abutting against a boundary portion between the top plate and the circumferential wall, the second annular circumferential wall of the second retainer abutting against a remaining part of the circumferential wall of the housing, and a boundary portion between the second annular circumferential wall and the second inward protruding portion abutting against a boundary portion between the bottom portion and the circumferential wall, and the first flange and the second flange abutting against each other.

The gas generator of the fourth aspect has the plurality of the gas discharge ports in the top plate of the housing.

With regard to the retainer of the second aspect used in the gas generator of the forth aspect, it is preferable to use the first retainer and the second retainer which have no through hole. However, in order to reduce weights of the first retainer and the second retainer, one or both of the first retainer and the second retainer may have the through holes within such a range that the function of retaining the housing is maintained. In that case, the number of the through holes and a formation position of the through hole are not particularly limited.

The present invention provides a gas generator (a gas generator of a fifth aspect), including:

the housing retained by the retainer of the first aspect from outside, the housing including the top plate, the bottom plate axially opposing the top plate, and the circumferential wall provided with no flange and formed between the top plate and the bottom plate, the circumferential wall with no flange having,
  a first smaller-diameter circumferential wall in contact with the top plate, a second smaller-diameter circumferential wall in contact with the bottom plate, and a larger-diameter circumferential wall which has an outer diameter larger than those of the first smaller-diameter circumferential wall and the second smaller-diameter circumferential wall, the first smaller-diameter circumferential wall on a side of the top plate or the top plate formed with a plurality of gas discharge ports,
  a first annular surface between the first smaller-diameter circumferential wall and the larger-diameter circumferential wall, and a second annular surface between the second smaller-diameter circumferential wall and the larger-diameter circumferential wall, the first annular circumferential wall of the first retainer abutting against a part of the larger-diameter circumferential wall of the circumferential wall of the housing, and the first inward protruding portion of the first retainer abutting against the first annular surface, the second annular circumferential wall of the second retainer abutting against a remaining part of the larger-diameter circumferential wall of the circumferential wall of the housing, and the first flange and the second flange abutting against each other.

An external shape of the housing (an external shape of the circumferential wall of the housing) of the gas generator of the fifth aspect is different from the external shape of the housing of the gas generator of each of the first aspect and the second aspect.

The circumferential wall of the housing of the gas generator of the fifth aspect has the first smaller-diameter circumferential wall in contact with the top plate, the second smaller-diameter circumferential wall in contact with the bottom plate, and the larger-diameter circumferential wall between the first smaller-diameter circumferential wall and the second smaller-diameter circumferential wall.

Further, the circumferential wall of the housing has the first annular surface between the first smaller-diameter circumferential wall and the larger-diameter circumferential wall, and the second annular surface between the second smaller-diameter circumferential wall and the larger-diameter circumferential wall. Each of the first annular surface and the second annular surface may be a flat surface (a surface parallel to the top plate or the bottom plate), or may be an inclined surface (a surface inclined relative to the top plate or the bottom plate).

A relationship among the outer diameters of the first smaller-diameter circumferential wall, the second smaller-diameter circumferential wall, and the larger-diameter circumferential wall satisfies the outer diameter of the first smaller-diameter circumferential wall<the outer diameter of the larger-diameter circumferential wall, and the outer diameter of the second smaller-diameter circumferential wall<the outer diameter of the larger-diameter circumferential wall. The outer diameters of the first smaller-diameter circumferential wall and the second smaller-diameter circumferential wall may be equal to or different from each other.

The gas discharge port can be formed in one or both of the top plate and the first smaller-diameter circumferential wall.

The first inward protruding portion of the first retainer is shaped so as to be able to abut against the first annular surface. A folded portion (a bent portion) at a boundary between the first inward protruding portion and the first folded portion of the first retainer preferably abuts against the first smaller-diameter circumferential wall.

A second inward protruding portion of the second retainer is shaped so as to be able to abut against the second annular surface. A folded portion (a bent portion) at a boundary between the second inward protruding portion and a second folded portion of the second retainer preferably abuts against the second smaller-diameter circumferential wall.

It is possible to retain the housing by fitting the first retainer and the second retainer from the side of the top plate of the housing or the side of the bottom plate of the housing.

Even in the case where the gas discharge ports are formed in the first smaller-diameter circumferential wall, the first annular circumferential wall of the first retainer and the second annular circumferential wall of the second retainer do not abut against the gas discharge ports. Accordingly, through holes overlapping the gas discharge ports of the housing of the gas generator are not provided, but a through hole can be formed in order to reduce weight within such a range that the function of retaining the gas generator housing is maintained.

The present invention provides a gas generator (a gas generator of a sixth aspect), including:

the housing retained by the retainer of the second aspect from outside, the housing including the top plate, the bottom plate axially opposing the top plate, and the circumferential wall provided with no flange and formed between the top plate and the bottom plate, the circumferential wall with no flange having,
a first smaller-diameter circumferential wall in contact with the top plate, a second smaller-diameter circumferential wall in contact with the bottom plate, and a larger-diameter circumferential wall that has an outer diameter larger than those of the first smaller-diameter circumferential wall and the second smaller-diameter circumferential wall, the first smaller-diameter circumferential wall on the side of the top plate or the top plate formed with a plurality of gas discharge ports,
a first annular surface between the first smaller-diameter circumferential wall and the larger-diameter circumferential wall and
a second annular surface between the second smaller-diameter circumferential wall and the larger-diameter circumferential wall, the first annular circumferential wall of the first retainer abutting against a part of the larger-diameter circumferential wall of the circumferential wall of the housing, and the first inward protruding portion of the first retainer abutting against the first annular surface, the second annular circumferential wall of the second retainer abutting against a remaining part of the larger-diameter circumferential wall of the circumferential wall of the housing, and the second inward protruding portion of the second retainer abutting against the second annular surface, and the first flange and the second flange abutting against each other.

The housing of the gas generator of the sixth aspect is identical to the housing of the gas generator of the fifth aspect described above.

It is possible to retain the housing by fitting the first retainer and the second retainer from the side of the top plate of the housing or the side of the bottom plate of the housing.

Even in the case where the gas discharge ports are formed in the first smaller-diameter circumferential wall, the first annular circumferential wall of the first retainer and the second annular circumferential wall of the second retainer do not abut against the gas discharge ports. Accordingly, through holes overlapping the gas discharge ports of the housing of the gas generator are not provided, but a through hole can be formed in order to reduce weight within such a range that the function of retaining the gas generator housing is maintained.

In the gas generator of the present invention, the housing is retained by the retainer from outside. Even when the gas generator is vibrated due to running of a vehicle and when internal pressure increases during actuation and the housing deforms, the housing is firmly retained by the retainer.

The gas generator of the present invention can be used as the gas generator for an airbag apparatus mounted on a vehicle.

EMBODIMENTS OF THE INVENTION (1) Retainer and gas generator shown in FIGS. 1 to 3

In a gas generator 1, required components such as a known igniter and a gas generating agent are accommodated in a housing 10 made of metal such as stainless steel or iron.

The housing 10 includes a top plate 11, a bottom plate 12 and a circumferential wall 13. A plurality of circular gas discharge ports 14 to be closed by a seal tape form inside are formed at regular intervals in a circumferential direction in the circumferential wall 13 on the side of the top plate 11.

The outer diameter of the circumferential wall 13 is uniform, the outer circumferential surface of the circumferential wall 13 is a flat surface with no stepped portion, and the circumferential wall 13 does not have a flange which protrudes outward in a radial direction of the housing 10 to fix the gas generator to an airbag module or the like.

The housing 10 is cylindrical, and has a ratio (H/D) between a diameter (D) of the bottom plate 12 and a height (H) from the outer surface of the bottom plate 12 to the outer surface of the top plate 11 of about 0.4. In FIG. 1, the diameter (D) of the bottom plate 12 is equal to a diameter of the circumferential wall 13.

A retainer 2 includes a combination of a first retainer 20 and a second retainer 30 which are made of the same metal as that of the housing 10.

The first retainer 20 has a first annular circumferential wall 21, a first flange 22, a first inward protruding portion 23 and a first folded portion 24.

The first annular circumferential wall 21 has a size and a shape which allow the first annular circumferential wall 21 to abut against the circumferential wall 13 of the housing 10 on the side of the top plate 11.

The first annular circumferential wall 21 has a plurality of through holes 25 formed at regular intervals in a circumferential direction. The plurality of the through holes 25 are circular, and the diameter of each through hole 25 is slightly larger than that of each of the plurality of the gas discharge ports 14.

The plurality of the through holes 25 of the first annular circumferential wall 21 are disposed such that, when the first retainer 20 is mounted to the housing 10, the plurality of the through holes 25 overlap the plurality of the gas discharge ports 14 respectively and all of the plurality of the gas discharge ports 14 are to be open. The plurality of the gas discharge ports 14 may be open with a single through hole 54.

The first flange 22 protrudes radially outward from a first end opening 21a of the first annular circumferential wall 21 shown in FIG. 2. The first flange 22 may have a through hole for connecting the gas generator 1 to a module case or for attaching a mouth of an airbag thereto using a fixing tool such as a bolt or the like.

The first inward protruding portion 23 protrudes radially inward at the side of a second end opening 21b of the first annular circumferential wall 21 shown in FIG. 2, and is formed into an annular inclined surface.

An angle between the first inward protruding portion 23 which is the annular inclined surface and the first annular circumferential wall 21 (in FIG. 3, an angle $\theta 2$ formed by a tangent to the first inward protruding portion 23 and a tangent to the first annular circumferential wall 21) is preferably 100 to 160 degrees, and is preferably 110 to 150 degrees. In the embodiment in FIG. 1, $\theta 2$ is about 120 degrees.

A thickness (t2) of the first inward protruding portion 23 is about 1 mm.

The first folded portion 24 is folded radially outward at a bent portion 24b from the first inward protruding portion 23 which is the annular inclined surface. The first folded portion 24 is an annular surface (a first annular folded portion 24).

A distal end 24a of the first folded portion 24 is preferably located at the same position as that of the outer circumferential surface of the first annular circumferential wall 21, or located on the radially outer side of the outer circumferential surface of the first annular circumferential wall 21. The first folded portion 24 forms a surface parallel to the top plate 11 in FIG. 1, but may form a surface inclined relative to the top plate 11.

An angle $\theta 1$ between the first inward protruding portion 23 and the first folded portion 24 (in FIG. 3, an angle formed by a tangent to the first inward protruding portion 23 and a tangent to the first folded portion 24) is preferably 10 to 70 degrees, and is preferably 20 to 60 degrees. In the embodiment in FIG. 1, $\theta 1$ is about 30 degrees, and satisfies a relationship of $\theta 2 > \theta 1$.

A thickness (t1) of the first folded portion 24 is about 1 mm.

The second retainer 30 has a second annular circumferential wall 31, a second flange 32, a second inward protruding portion 33, and a second folded portion 34.

The second annular circumferential wall 31 has a size and a shape which allow the second annular circumferential wall 31 to abut against the circumferential wall 13 of the housing 10 on the side of the bottom plate 12.

The second flange 32 protrudes radially outward from a first end opening 31a of the second annular circumferential wall 31 shown in FIG. 2. The second flange 32 may have a through hole for connecting the gas generator 1 to a module case or for attaching a mouth of an airbag thereto using a fixing tool such as a bolt or the like.

The second inward protruding portion 33 protrudes radially inward at the side of a second end opening 31b of the second annular circumferential wall 31 shown in FIG. 2, and is formed into an annular inclined surface.

An angle $\theta 12$ (an angle corresponding to the angle $\theta 2$ in FIG. 3) between the second inward protruding portion 33 which is the annular inclined surface and the second annular circumferential wall 31 (an inner angle) is about 120 degrees.

A thickness (t12) of the second inward protruding portion 33 is about 1 mm.

The second folded portion 34 is folded radially outward at a bent portion 34b from the second inward protruding portion 33 which is the annular inclined surface. The second folded portion 34 is an annular surface (a second annular folded portion 34).

A distal end 34a of the second folded portion 34 is preferably located at the same position as that of the outer circumferential surface of the second annular circumferential wall 31, or located on the radially outer side of the outer circumferential surface of the second annular circumferential wall 31. The second folded portion 34 forms a surface parallel to the bottom plate 12 in FIG. 1, but may form a surface inclined relative to the bottom plate 12.

An angle $\theta 11$ (an angle corresponding to the angle $\theta 1$ in FIG. 3) between the second inward protruding portion 33 and the second folded portion 34 (an inner angle) is about 30 degrees, and satisfies a relationship of θ12>θ11.

A thickness (t11) of the second folded portion 34 is about 1 mm.

Next, a mounting state of the first retainer 20 and the second retainer 30 to the housing 10 will be described.

In the first retainer 20, the first annular circumferential wall 21 abuts against the circumferential wall 13 of the housing on the side of the top plate 11 such that the plurality of the through holes 25 overlap the plurality of the gas discharge ports 14 respectively in a thickness direction.

The center of each of the through holes 25 coincides with the center of each of the gas discharge ports 14 corresponding thereto in the thickness direction, and a diameter of each of the through holes 25 is larger than a diameter of each of the gas discharge ports 14 corresponding thereto in the thickness direction.

A boundary portion between the first annular circumferential wall 21 and the first inward protruding portion 23 abuts against a boundary portion between the circumferential wall 13 and the top plate 11 of the housing 10.

The bent portion 24b of the first folded portion 24 is positioned over the top plate 11 that is located on the radially inner side of the first annular circumferential wall 21 (a state in which the bent portion 24b is spaced from the top plate 11).

In the second retainer 30, the second annular circumferential wall 31 abuts against the circumferential wall 13 of the housing on the side of the bottom plate 12, and a boundary portion between the second annular circumferential wall 31 and the second inward protruding portion 33 abuts against a boundary portion between the circumferential wall 13 and the bottom plate 12 of the housing 10.

The bent portion 34b of the second folded portion 34 is located under the bottom plate 12 which is located on the radially inner side of the second annular circumferential wall 31 (a state in which the bent portion 34b is spaced from the bottom plate 12).

The first flange 22 of the first retainer 20 and the second flange 32 of the second retainer 30 abut against each other. When the first flange 22 has a through hole and the second flange 32 has a through hole, the first flange 22 and the second flange 32 abut against each other such that the through holes of the respective flanges match each other to form a single through hole passing through the first flange 22 and the second flange 32.

When the first retainer 20 and the second retainer 30 are mounted to the housing 10, as shown in FIG. 1, the first retainer 20 is fitted from the side of the top plate 11 of the housing, the second retainer 30 is fitted from the side of the bottom plate 12 of the housing, and the first flange 22 and the second flange 32 are caused to abut against each other.

The first folded portion 24 functions to support the housing 10 from the side of the top plate 11 via the first annular circumferential wall 21, the first inward protruding portion 23, and the boundary portion between the first annular circumferential wall 21 and the first inward protruding portion 23.

The second folded portion 34 functions to support the housing 10 from the side of the bottom plate 12 via the second annular circumferential wall 31, the second inward protruding portion 33, and the boundary portion between the second annular circumferential wall 31 and the second inward protruding portion 33.

The first folded portion 24 and the second folded portion 34 have the function of increasing the strengths of the first inward protruding portion 23 and the second inward protruding portion 33 without coming into direct contact with the housing 10. In FIG. 1, when the housing 10 is pushed in a direction of an axis X, as compared with the case where the first folded portion 24 and the second folded portion 34 are not provided, the first inward protruding portion 23 and the second inward protruding portion 33 hardly deform, and the housing 10 is hardly disconnected from the retainer 2.

A function of the retainer 2 in FIG. 1 will be described by using an example when the gas generator 1 is actuated.

Before actuation of the gas generator 1, the housing 10 is retained by the first annular circumferential wall 21 and the first inward protruding portion 23 of the first retainer 20, and the second annular circumferential wall 31 and the second inward protruding portion 33 of the second retainer 30.

During the actuation of the gas generator 1, a combustion gas generated inside the gas generator 1 ruptures a seal tape and is discharged from the gas discharge port 14 to inflate the airbag. A reaction force at the time of the inflation is applied to the top plate 11 of the housing 10, and the housing 10 is about to move to the lower side (toward the bottom plate 12) in FIG. 1 along the axis X.

At this point, the second folded portion 34 functions to prevent deformation of the second inward protruding portion 33, and hence the housing 10 is prevented from moving toward the bottom plate 12 in the direction of the axis X. In addition, when the housing 10 is about to move upward (toward the top plate 11) along the axis X in FIG. 1 due to vibrations or the like after the gas generator 1 is mounted on a vehicle, the deformation of the first inward protruding portion 23 is prevented by the first folded portion 24, and the housing 10 is hardly disconnected from the retainer 2.

(2) Retainer and Gas Generator Shown in FIG. 4

In FIG. 4, a first retainer 20B different from that in FIG. 1 and the second retainer 30 identical to that in FIG. 1 are mounted to the housing 10 of the gas generator 1 identical to that in FIG. 1.

Similarly to the first retainer 20 in FIG. 1, the first retainer 20B has the first annular circumferential wall 21 and the first flange 22, but does not have the first inward protruding portion 23 and the first folded portion 24 of the first retainer 20 in FIG. 1. The first retainer 20B is fitted from the side of the top plate 11 of the housing, the second retainer 30 is fitted from the side of the bottom plate 12 of the housing, and the housing 10 of the gas generator 1 is thereby supported from outside.

(3) Retainer and Gas Generator Shown in FIG. 5

In a gas generator 100 in FIG. 5A, a shape of a housing is different from that of the gas generator 1 in FIG. 1, and accordingly, a shape of a retainer is also different.

In the gas generator 100, required components such as a known igniter and a gas generating agent are accommodated in a housing 110 made of metal such as stainless steel or iron.

The housing 110 includes a top plate 111, a bottom plate 112 and a circumferential wall 113.

The circumferential wall 113 has a first smaller-diameter circumferential wall 114 in contact with the top plate 111, a second smaller-diameter circumferential wall 115 in contact with the bottom plate 112, and a larger-diameter circumferential wall 116 between the first smaller-diameter circumferential wall 114 and the second smaller-diameter circumferential wall 115.

In the first smaller-diameter circumferential wall 114, a plurality of circular gas discharge ports 119 which are to be closed by a seal tape from inside are formed at regular intervals in a circumferential direction.

An outer diameter of the first smaller-diameter circumferential wall 114, an outer diameter of the second smaller-diameter circumferential wall 115, and an outer diameter of the larger-diameter circumferential wall 116 satisfy relationships of the outer diameter of the first smaller-diameter circumferential wall 114<the outer diameter of the larger-diameter circumferential wall 116, and the outer diameter of the second smaller-diameter circumferential wall 115<the outer diameter of the larger-diameter circumferential wall 116. In the embodiment in FIG. 5, the outer diameter of the first smaller-diameter circumferential wall 114 and the outer diameter of the second smaller-diameter circumferential wall 115 are equal to each other, but they may be different from each other.

Between the first smaller-diameter circumferential wall 114 and the larger-diameter circumferential wall 116, a first annular surface 117 is formed by a difference in outer diameter thereof and, between the second smaller-diameter circumferential wall 115 and the larger-diameter circumferential wall 116, a second annular surface 118 is formed by a difference in outer diameter thereof.

The housing 110 is substantially cylindrical, and has a ratio (H/D) of a diameter (D) of the bottom plate 112 and a height (H) from the outer surface of the bottom plate 112 to the outer surface of the top plate 111 of about 0.8.

A retainer 102 includes a combination of a first retainer 120 and a second retainer 130 which are made of the same metal as that of the housing 110.

As shown in FIG. 6, the first retainer 120 has a first annular circumferential wall 121, a first flange 122, a first inward protruding portion 123, and a first folded portion 124.

The first annular circumferential wall 121 has a size and a shape which allow the first annular circumferential wall 121 to abut against the larger-diameter circumferential wall 116 on the side of the smaller-diameter circumferential wall 114 of the housing 110.

The first flange 122 protrudes radially outward from a first end opening 121a of the first annular circumferential wall 121 shown in FIG. 6. The first flange 122 may have a through hole for connecting the gas generator 100 to a module case or for attaching a mouth of an airbag thereto using a fixing tool such as a bolt or the like.

The first inward protruding portion 123 protrudes radially inward at the side of a second end opening 121b of the first annular circumferential wall 121 shown in FIG. 6, and is formed into an annular inclined surface.

An angle θ22 between the first inward protruding portion 123 which is the annular inclined surface and the first annular circumferential wall 121 (in FIG. 6, an angle formed by a tangent to the first inward protruding portion 123 and a tangent to the first annular circumferential wall 121) is about 120 degrees.

A thickness (t21) of the first inward protruding portion 123 is about 1 mm.

The first folded portion 124 is folded radially outward at a first bent portion 124b from the first inward protruding portion 123 which is the annular inclined surface. The first folded portion 24 is an annular surface (a first annular folded portion 124).

A distal end 124a of the first folded portion 124 is preferably located at the same position as that of the outer circumferential surface of the first annular circumferential wall 121, or located on the radially outer side of the outer circumferential surface of the first annular circumferential wall 121.

An angle θ21 between the first inward protruding portion 123 and the first folded portion 124 (in FIG. 6, an angle formed by a tangent to the first inward protruding portion 123 and a tangent to the first folded portion 124) is about 30 degrees, and satisfies a relationship of θ22>θ21.

A thickness (t21) of the first folded portion 124 is about 1 mm.

The second retainer 130 has a second annular circumferential wall 131, a second flange 132, a second inward protruding portion 133 and a second folded portion 134.

The second annular circumferential wall 131 has a size and a shape which allow the second annular circumferential wall 131 to abut against the larger-diameter circumferential wall 116 on the side of the second smaller-diameter circumferential wall 115 of the housing 110.

The second flange 132 protrudes radially outward from a first end opening 131a of the second annular circumferential wall 131 shown in FIG. 6. The second flange 132 may have a through hole for connecting the gas generator 100 to a module case or for attaching a mouth of an airbag thereto using a fixing tool such as a bolt or the like.

The second inward protruding portion 133 protrudes radially inward at the side of a second end opening 131b of the second annular circumferential wall 131 shown in FIG. 6, and is formed into an annular inclined surface.

An angle θ32 between the second inward protruding portion 133 which is the annular inclined surface and the second annular circumferential wall 131 (in FIG. 6, an angle formed by a tangent to the second inward protruding portion 133 and a tangent to the second annular circumferential wall 131) is about 120 degrees.

A thickness (t32) of the second inward protruding portion 133 is about 1 mm.

The second folded portion 134 is folded radially outward at a second bent portion 134b from the second inward protruding portion 133 which is the annular inclined surface. The second folded portion 134 is an annular surface (a second annular folded portion 134).

A distal end 134a of the second folded portion 134 is preferably located at the same position as that of the outer circumferential surface of the second annular circumferential wall 131, or located on the radially outer side of the outer circumferential surface of the second annular circumferential wall 131.

An angle θ31 between the second inward protruding portion 133 and the second folded portion 134 (in FIG. 6, an angle formed by a tangent to the second inward protruding portion 133 and a tangent to the second folded portion 134) is about 30 degrees, and satisfies a relationship of θ32>θ31.

A thickness (t31) of the second folded portion 134 is about 1 mm.

Next, a mounting state of the first retainer 120 and the second retainer 130 to the housing 110 will be described.

In the first retainer 120, the first annular circumferential wall 121 abuts against the larger-diameter circumferential wall 116 of the housing on the side of the first smaller diameter circumferential wall 114 and the first inward protruding portion 123 abuts against the first annular surface 117.

A boundary portion between the first annular circumferential wall 121 and the first inward protruding portion 123 abuts against a boundary portion between the larger-diameter circumferential wall 116 and the first smaller-diameter circumferential wall 114.

A boundary portion between the first inward protruding portion 123 and the first folded portion 124 (the first bent portion 124b) abuts against the first smaller-diameter circumferential wall 114.

The first retainer 120 is not in contact with the plurality of the gas discharge ports 119 formed in the first smaller-diameter circumferential wall 114.

In the second retainer 130, the second annular circumferential wall 131 abuts against the larger-diameter circumferential wall 116 of the housing on the side of the second smaller-diameter circumferential wall 115, and the second inward protruding portion 133 abuts against the second annular surface 118.

A boundary portion between the second annular circumferential wall 131 and the second inward protruding portion 133 abuts against a boundary portion between the larger-diameter circumferential wall 116 and the second smaller-diameter circumferential wall 115.

A boundary portion between the second inward protruding portion 133 and the second folded portion 134 (the second bent portion 134b) abuts against the second smaller-diameter circumferential wall 115.

The first flange 122 of the first retainer 120 and the second flange 132 of the second retainer 130 abut against each other. When the first flange 122 has a through hole and the second flange 132 has a through hole, the first flange 122 and the second flange 132 abut against each other such that the through holes of the respective flanges match each other to form a single through hole passing through the first flange 122 and the second flange 132.

When the first retainer 120 and the second retainer 130 are mounted to the housing 110, as shown in FIGS. 5 and 6, the first retainer 120 is fitted from the side of the top plate 111 of the housing, the second retainer 130 is fitted from the side of the bottom plate 112 of the housing, and the first flange 122 and the second flange 132 are caused to abut against each other.

The first folded portion 124 functions to support the housing 110 from the side of the top plate 111 via the first annular circumferential wall 121, the first inward protruding portion 123, the boundary portion between the first inward protruding portion 123 and the first annular circumferential wall 121, and the first bent portion 124b.

The second folded portion 134 functions to support the housing 110 from the side of the bottom plate 112 via the second annular circumferential wall 131, the second inward protruding portion 133, the boundary portion between the second inward protruding portion 133 and the second annular circumferential wall 131, and the second bent portion 134b.

The first folded portion 124 and the second folded portion 134 have a function of increasing the strengths of the inward protruding portions 123 and 133 without coming into direct contact with the housing 110. Accordingly, in FIGS. 5 and 6, when the housing 110 is pushed in the direction of the axis X, as compared with the case where the folded portions 124 and 134 are not provided, the first inward protruding portion 123 and the second inward protruding portion 133 hardly deform, and the housing 110 is hardly disconnected from the retainer 102.

An operation of the retainer 102 in FIG. 5 will be described by using an example when the gas generator 100 is actuated.

Before actuation of the gas generator 100, the housing 110 is retained by the first annular circumferential wall 121 and the first inward protruding portion 123 of the first retainer 120, and the second annular circumferential wall 131 and the second inward protruding portion 133 of the second retainer 130.

During the actuation of the gas generator 100, a combustion gas generated inside the gas generator 100 ruptures the seal tape and is discharged from the gas discharge ports 119 to inflate the airbag.

The reaction force at the time of the inflation is applied to the top plate 111 of the housing 110, and the housing is about to move to the lower side (toward the bottom plate 112) in FIG. 5 along the axis X. At this point, the second folded portion 134 functions to prevent deformation of the second inward protruding portion 133, and hence the housing 110 is prevented from moving to the lower side (toward the bottom plate 112) in the direction of the axis X. In addition, when the housing 110 is about to move to the upper side (toward the top plate 111) of the axis X in FIG. 5 due to vibrations or the like after the gas generator 100 is mounted on a vehicle, the deformation of the first inward protruding portion 123 is prevented by the first folded portion 124, and the housing 110 is hardly disconnected from the retainer 102.

(4) Retainer and Gas Generator Shown in FIG. 7

A gas generator 1A shown in FIG. 7 is identical to the gas generator 1 in FIG. 1 except that a plurality of gas discharge ports are formed in the top plate 11.

A first retainer 20A in FIG. 7 is identical to the first retainer 20 in FIG. 1 except that the first annular circumferential wall 21 does not have the through hole 25. The second retainer 30 in FIG. 7 is identical to the second retainer 30 in FIG. 1. The first retainer 20A and the second retainer 30 in FIG. 7 are identical to each other, and hence the first retainer 20A and the second retainer 30 may be fitted from both the side of the top plate 11 and the side of the bottom plate 12.

EXAMPLES

Example 1 and Comparative Example 1

As the gas generator in Example 1, the gas generator 100 shown in FIG. 5 in which the housing 110 was retained by only the first retainer 120 shown in FIG. 6 was used.

As the gas generator of Comparative Example 1, the gas generator 100 shown in FIG. 5, in which only a retainer (a first retainer for comparison) provided with no first folded portion 124 was used instead of the first retainer 120 shown in FIG. 6.

A test of a retaining force for the housing 110 of each of the first retainer 120 of Example 1 and the first retainer for comparison of Comparative Example 1 to the housing 110 was performed according to the following method.

As shown in FIG. 8, the gas generator 100 in which the first retainer 120 of Example 1 was mounted to the side of the top plate 111 was placed on a cylindrical fixed base 200 such that the top plate 111 faced downward. At this point, the first flange 122 was screwed to an annular end surface 201 of the cylindrical fixed base 200, and the housing 110 was located inside an opening of the cylindrical fixed base 200.

Thereafter, the housing 110 was disconnected from the first retainer 120 by applying a load to the bottom plate 112 of the housing 110 with a tension and compression testing machine, and the load at the time of the disconnection was measured. The test was conducted similarly on the gas generator to which the first retainer for comparison was mounted.

As a result, the load when the housing 110 was disconnected from the first retainer 120 of Example 1 was 21 N, and the load when the housing 110 was disconnected from the retainer for comparison of Comparative Example 1 was 16 N.

From this result, it was determined that the retaining force from both sides in the direction of the axis X of the housing by the retainers having the folded portions of the present invention (the first retainer having the first folded portion and the second retainer having the second folded portion) was larger.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A retainer for retaining, from outside, a housing of a gas generator which includes a top plate, a bottom plate axially opposing the top plate, and a circumferential wall provided with no flange and formed between the top plate and the bottom plate, the retainer comprising:
   a combination of
      a first retainer including,
         a first annular circumferential wall,
         a first flange which protrudes radially outward from a first end opening of the first annular circumferential wall,
         a first inward protruding portion which protrudes radially inward at the side of a second end opening of the first annular circumferential wall, and
         a first folded portion which is folded radially outward from the first inward protruding portion; and
      a second retainer including,
         a second annular circumferential wall, and
         a second flange which protrudes radially outward from a first end opening of the second annular circumferential wall,
   the first retainer being fitted from the side of the top plate or the side of the bottom plate of the housing of the gas generator such that the first annular circumferential wall abuts against a part of the circumferential wall of the housing of the gas generator, the second retainer being fitted from the side of the bottom plate or the side of the top plate of the housing of the gas generator such that the second annular circumferential wall abuts against a remaining part of the circumferential wall of the housing of the gas generator, and
   the first flange and the second flange being abutted against each other, so as to retain the housing of the gas generator.

2. The retainer according to claim 1, wherein the second retainer includes,
   a second inward protruding portion protruding radially inward at the side of a second end opening of the second annular circumferential wall, and
   a second folded portion folded radially outward from the second inward protruding portion.

3. The retainer according to claim 1, wherein the first annular circumferential wall of the first retainer or the second annular circumferential wall of the second retainer has a plurality of through holes corresponding to a plurality of gas discharge ports provided in the circumferential wall of the housing of the gas generator when the housing of the gas generator is retained from outside.

4. The retainer according to claim 2, wherein the first annular circumferential wall of the first retainer has a plurality of through holes corresponding to a plurality of gas discharge ports in the circumferential wall of the housing of the gas generator when the housing of the gas generator is retained from outside.

5. A gas generator, comprising:
   the housing retained by the retainer according to claim 3 from outside,
      when the second retainer has the through holes,
         the second annular circumferential wall of the second retainer abutting against a part of the circumferential wall of the housing such that the plurality of the through holes overlap the gas discharge ports respectively in a thickness direction, and
         the first annular circumferential wall of the first retainer abutting against a remaining part of the circumferential wall of the housing, and a boundary portion between the first annular circumferential wall and the first inward protruding portion abutting against a boundary portion between the bottom plate and the circumferential wall, and
      when the first retainer has the through holes,
         the first annular circumferential wall of the first retainer abutting against the part of the circumferential wall of the housing such that the plurality of through holes overlap the gas discharge ports in the thickness direction respectively, and the boundary portion between the first annular circumferential wall and the first inward protruding portion abutting against a boundary portion between the top plate and the circumferential wall, and
         the second annular circumferential wall of the second retainer abutting against a remaining part of the circumferential wall of the housing.

6. A gas generator, comprising:
   the housing retained by the retainer according to claim 4 from outside,
   the first annular circumferential wall of the first retainer abutting against a part of the circumferential wall of the housing such that the plurality of the through holes overlap the gas discharge ports in a thickness direction, and a boundary portion between the first annular circumferential wall and the first inward protruding portion abutting against a boundary portion between the top plate and the circumferential wall, and
   the second annular circumferential wall of the second retainer abutting against a remaining part of the circumferential wall of the housing, and a boundary portion between the second annular circumferential wall and the second inward protruding portion abutting against a boundary portion between the bottom plate and the circumferential wall.

7. A gas generator, comprising:
   the housing retained by the retainer according to claim 1 from outside, the housing further including a plurality of gas discharge ports formed in the top plate,
   the first annular circumferential wall of the first retainer abutting against a part of the circumferential wall of the housing, and a boundary portion between the first annular circumferential wall and the first inward protruding portion abutting against a boundary portion between the top plate or the bottom plate and the circumferential wall, and
   the second annular circumferential wall of the second retainer abutting against a remaining part of the circumferential wall of the housing.

8. A gas generator, comprising:
the housing retained by the retainer according to claim 2 from outside, the housing further including a plurality of gas discharge ports formed in the top plate,
the first annular circumferential wall of the first retainer abutting against a part of the circumferential wall of the housing, and a boundary portion between the first annular circumferential wall and the first inward protruding portion abutting against a boundary portion between the top plate and the circumferential wall, and
the second annular circumferential wall of the second retainer abutting against a remaining part of the circumferential wall of the housing, and a boundary portion between the second annular circumferential wall and the second inward protruding portion abutting against a boundary portion between the bottom portion and the circumferential wall.

9. A gas generator, comprising:
the housing retained by the retainer according to claim 1 from outside, the housing further including a first smaller-diameter circumferential wall in contact with the top plate,
a second smaller-diameter circumferential wall in contact with the bottom plate,
a larger-diameter circumferential wall which has an outer diameter larger than those of the first smaller-diameter circumferential wall and the second smaller-diameter circumferential wall,
a plurality of gas discharge ports formed in the first smaller-diameter circumferential wall,
a first annular surface between the first smaller-diameter circumferential wall and the larger-diameter circumferential wall,
a second annular surface between the second smaller-diameter circumferential wall and the larger-diameter circumferential wall,
the first annular circumferential wall of the first retainer abutting against a part of the larger-diameter circumferential wall of the circumferential wall of the housing, and the first inward protruding portion of the first retainer abutting against the first annular surface, and
the second annular circumferential wall of the second retainer abutting against a remaining part of the larger-diameter circumferential wall of the circumferential wall of the housing.

10. A gas generator, comprising:
the sing retained by the retainer according to claim 2 from outside, the housing further including,
a first smaller-diameter circumferential wall in contact with the top plate,
a second smaller-diameter circumferential wall in contact with the bottom plate,
a larger-diameter circumferential wall which has an outer diameter larger than those of the first smaller-diameter circumferential wall and the second smaller-diameter circumferential wall,
a plurality of gas discharge ports formed in the first smaller-diameter circumferential wall,
a first annular surface between the first smaller-diameter circumferential wall and the larger-diameter circumferential wall,
a second annular surface between the second smaller-diameter circumferential wall and the larger-diameter circumferential wall,
the first annular circumferential wall of the first retainer abutting against a part of the larger-diameter circumferential wall of the circumferential wall of the housing, and the first inward protruding portion of the first retainer abutting against the first annular surface, and
the second annular circumferential wall of the second retainer abutting against a remaining part of the larger-diameter circumferential wall of the circumferential wall of the housing, and the second inward protruding portion of the second retainer abutting against the second annular surface.

11. A gas generator, comprising:
the housing retained by the retainer according to claim 1 from outside, the housing further including,
a plurality of gas discharge ports formed in the top plate.

12. A gas generator, comprising:
the housing retained by the retainer according to claim 2 from outside, the housing further including,
a plurality of gas discharge ports formed in the top plate.

* * * * *